Dec. 17, 1968   L. R. FFRENCH ETAL   3,417,159
SEPARATION OF HYDROCARBONS FROM PLANT PROCESS WASTE WATER
Filed Nov. 7, 1966
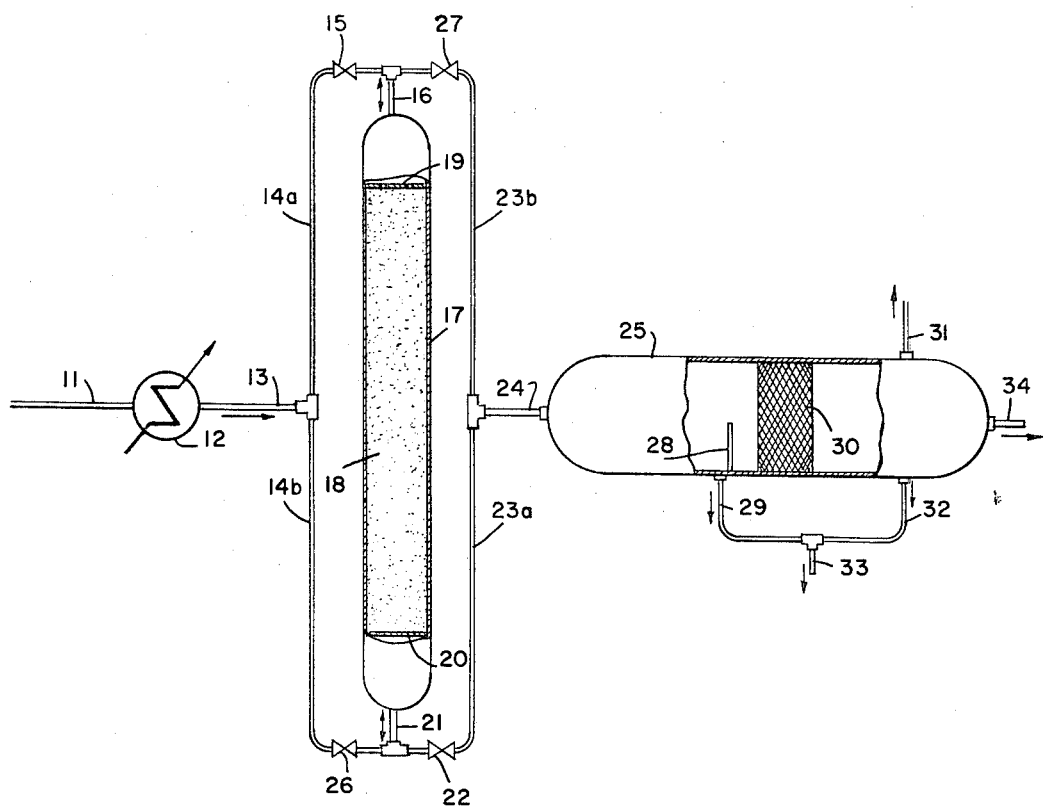
INVENTORS
Lawrence R. Ffrench
John R. Strausser
John L. Thompson 3,417,159
SEPARATION OF HYDROCARBONS FROM PLANT PROCESS WASTE WATER
Lawrence R. Ffrench and John R. Strausser, Baytown, Tex., and John L. Thompson, La Porte, Ill., assignors to Gulf Oil Corporation, Pittsburgh, Pa., a corporation of Pennsylvania
Filed Nov. 7, 1966, Ser. No. 592,459
10 Claims. (Cl. 260—677)

ABSTRACT OF THE DISCLOSURE

Aromatic and olefinic hydrocarbons which are dissolved and entrained in plant process waste water are contacted with crystalline silica, quartz or high purity sand to coalesce or agglomerate the hydrocarbons and form a separate phase. The crystalline silica has a particle size of 8–20 mesh. The waste water becomes reusable in the plant process and the hydrocarbon constituents are easily recovered.

---

This invention relates to a process for the separation of dissolved and entrained hydrocarbons from aqueous media. More particularly, this invention relates to a process for the separation and recovery of unsaturated hydrocarbons from plant process waste water employing a siliceous coalescing medium.

In the catalytic and thermal conversion of hydrocarbons to produce low molecular weight unsaturated hydrocarbons, such as ethylene and propylene, the temperatures of conversion may range from 800° up to about 1500° F. and higher. High temperatures of such a magnitude are required in order to obtain desirable yields of the low molecular weight unsaturated products. However, these low molecular weight products are reactive at high temperatures and will undergo further reaction to less desirable products, unless the reaction is stopped. The most usual method for preventing these undesirable reactions is to rapidly cool or quench the product gases to a temperature below that at which any undesired reaction can proceed. Ordinarily, the quenching operation is conducted with water which is directly injected into the product gas stream by some means such as a plurality of spray nozzles.

Although water is highly suitable for quenching purposes since it is both effective and inexpensive, the use of water has one great attendant disadvantage. After the water has been employed as a quenching agent for the highly unsaturated reaction effluent, it contains significant amounts of dissolved and entrained oils. These oils are highly unsaturated and comprise aromatics, olefins and heavy tar polymers. In addition to these oils, the waste water contains aldehydes, ketones, acids and carbon particles.

These significant quantities of unasturated oils ordinarily require that the waste water be sewered, since it is undesirable to reuse this oil-contaminated water in various processing operations. The oil content of this waste water will adversely affect process equipment, such as when it is used in high temperature heat exchange equipment, e.g. shell and tube heaters, etc. On the other hand, the discharge of this plant process waste water into local streams can create a pollution problem, since sufficient oil is present in the waste water to adversely affect fish and wildlife.

Accordingly, it would be desirable to purify this water to such an extent that it could be discharged into local streams without causing a pollution problem, or reused in process equipment. It would be further desirable to recover the entrained and dissolved aromatic and olefinic oils, since the aggregate of this material has many industrial and commercial applications. The aromatic and unsaturated constituents may be individually recoverd and employed as precursors for useful products, or the oils per se may be utilized, e.g. as drying oils.

The use of chemical means for separating dissolved and entrained hydrocarbons from aqueous media is undesirable, since it requires the employment of costly chemical reagents which are themselves contaminants.

The employment of simple gravity-type settling drums, commercial coalescers and filters for the separation of dissolved and entrained hydrocarbons from aqueous media is likewise undesirable. Such means involve high operating and maintenance costs. Additionally, the conventional gravity-type coalescers yield rather crude and inconsistent separations, while filter-coalescers of the commercial variety are expensive to operate.

This invention has for its object to provide a simple, efficient and economical process for the separation of entrained and dissolved unsaturated hydrocarbons from aqueous media.

Another object of this invention is to provide a process for the recovery of unsaturated oils from large volumes of plant process waste water.

A still further object of this invention is to provide a process for the recovery of unsaturated oils from water which had been previously employed in the direct quenching of a cracking operation effluent.

These and other objects are accomplished by the practice of this invention which, briefly, comprises contacting aqueous media containing dissolved and entrained unsaturated oils with a coalescing medium comprising crystalline silica having a particle size in the range of between about 8 and about 20 mesh. This simple contacting results in coalescing and agglomeration of the dissolved and entrained hydrocarbons and permits their removal from the aqueous medium. In the case of waste water which had been previously heated, such as that employed in the direct quenching of a cracking effluent gas, it is essential that the water be cooled to about ambient temperature prior to contact with the silica particles. The solubilities of such hydrocarbons in water and water in the hydrocarbons are markedly reduced by cooling the waste water to ambient temperatures and a physical separation is favored.

Subsequent to the contacting of the aqueous media containing the dissolved and entrained unsaturated hydrocarbons with the siliceous particles, the resulting stream is passed to a coalescer or settling drum where the agglomerated oils are allowed to separate from the high purity aqueous medium. In the settling drum, the previously-dissolved and entrained unsaturated hydrocarbons separate from the aqueous media into light and/or heavy oils, including polymer tars, so that an individual recovery of the various fractions may be effected.

In the following description and examples, several of the preferred embodiments have been set forth, but it is to be understood that they are given by way of illustration only and not in limitation thereof.

The particle size of the crystalline silica coalescing media which is employed in the process of this invention is critical. It is required that the particle size of this medium be in the range of between about 8 and about 20 mesh in order to obtain an efficient separation. Silica coalescing media having a particle size outside of this range will not effect the desired coalescing and agglomeration of the unsaturated oils.

The coalescing medium of this invention is broadly characterized as comprising crystalline silica of a fairly high purity. The preferred medium of this class is quartz. However, sand of a lower purity than quartz, but without excessive organic materials, or other inert particles, may be successfully employed. Other forms of silica including tridymite and cristobalite, as well as silica-containing clays, such as kaolin and fire clay are suitable for the process of this invention.

The process of this invention finds unique application, but is not limited to the recovery of dissolved and entrained hydrocarbons that are present in water, which had been previously employed as a direct quenching medium for cracking effluent gases. These hydrocarbons comprise both light and heavy oils, which are highly unsaturated and are composed of olefins, aromatics and heavy polymer tars having specific gravities equal to or greater than water, i.e. 1.0 measured at 60° F.

The quenching waste waters ordinarily contain such unsaturated oils in amounts which are significant enough to make recovery thereof desirable, but small enough to make the realization of their recovery difficult, i.e. about 400 p.p.m. It was therefore surprising to discover that these oils could be efficiently recovered from the waste quench water by employing a fairly high purity crystalline silica of a particular particle size. The purified water contains about 15 p.p.m. oil, and water containing as low as 10 p.p.m. oil is possibly by the practice of this invention. In addition to the highly unsaturated oils, this waste water usually contains aldehydes, ketones, acids and carbon particles and has a pH of from about 4 to about 6.

The invention will be further illustrated by reference to the accompanying drawing.

Referring to the drawing, a process waste water, which had been previously employed as a cracking gas quenching medium containing from about 150 to about 450 p.p.m. of extractable oil, is passed through a line 11 into a heat exchanger 12. The heat exchanger cools the stream from a temperature in the range of from about 125° to about 180° F. to a lower temperature in the range of from about 60° to about 100° F. As previously mentioned, the waste water should be at about ambient temperature prior to contact with the coalescing medium, so that physical separation is favored.

The cooled stream is passed by way of a line 13, into the line 14a and through a valve 15 into a line 16, by means of which it is introduced into the column 17. The column 17 is packed with a filter or coalescing medium 18 comprised of a siliceous crystalline material, such as quartz. The coalescing medium 18 is held in place in the column 17 by the grid means 19 and 20. It is vital to the success of this operation that the siliceous material have a particle size in the range of between about 8 and about 20 mesh. The process water, which contains agglomerated hydrocarbons is discharged from the column 17 by means of the line 21 and passed by means of a valve 22 and a line 23a to a line 24 by means of which the stream is introduced into the coalescer or settling vessel 25. During this "downward flow" mode of operation in which the process stream is passed downwardly through the column 17, the valves 26 and 27 are closed.

Alternatively, the process stream to be treated may be transferred from the line 13 to the line 14b and through a valve 26 and into the line 21 by means of which the stream is introduced upwardly through the column 17. The filtered process stream is then discharged from the column 17 by means of the line 16 and through the valve 27 into the line 23b. The treated stream is then introduced into the coalescer or settling vessel 25 by means of the line 24 as in the previous-described "downward flow" mode of operation. For the "upward flow" operation the valves 15 and 22 are closed.

For both the downflow and upflow operations, a residence time of from about 1 to 3 minutes is sufficient to obtain the desired agglomeration of the dissolved and entrained unsaturated oils. Likewise, a superficial velocity in the range of from about 0.01 to about 0.10 feet per second may be satisfactorily employed in either case. However, these values are only exemplary and may be varied over a broad range according to the nature of the particular stream to be treated, etc.

The conditions employed in the coalescer 25 may be varied over a wide range. A suitable residence time for the process water stream containing agglomerated oil includes a period of from about 3 to about 10 minutes, while the superficial velocity of this stream through the coalescer 25 may be in the range of from about 0.005 to about 0.04 feet per second.

The coalescer 25 contains a baffle 28 which assists in removing the agglomerated heavy oil and polymeric material from the water stream. This materail is discharged from the coalescer 25 by means of a line 29 and the recovered heavy oil may be separated and utilized as previously indicated.

A wire mesh 30 may be positioned in the settling vessel 25 to additionally aid in separating the agglomerated material into the desired fractions. The agglomerated light oil is recovered from the settling vessel 25 by means of a line 31, while any of the agglomerated heavy oil not previously removed by the line 29 is removed by a line 32. The heavy oil fractions discharged by means of the lines 29 and 32 are combined in the line 33 and recovered in the aggregate.

The resulting treated water stream is removed from the settling vessel 25 at the intermediate line 34 and contains about 15 p.p.m. oil. This substantially pure water may be discharged into local streams and waterways without causing a pollution problem, or may be satisfactorily re-used in process equipment that would otherwise be adversely affected by the presence of dissolved and/or entrained oil.

The dissolved and entrained hydrocarbons may be recovered from the process waste water in amounts up to about 97 percent by weight of the initial hydrocarbons present.

In order that a more clear indication of the superiority of the present invention may be had, the results of runs made employing the process of this invention are set forth in the following specific examples. These examples are only illustrative and are not intended to be limiting as to scope. The percentages indicated are by weight unless otherwise indicated.

EXAMPLES 1–5

The following table lists the operating conditions and results obtained when process waste water containing the amounts of oil specified is treated according to the process of this invention at the temperatures and flow rates indicated. The coalescing medium employed is quartz with a particle size in the range of from about 8 to about 20 mesh. The processing circuit employed is that of filtration with the quartz particles followed by coalescing of the unsaturated oils in a settling drum.

TABLE

| Example Number | Temp., °F. | Rate, g.p.m. | Initial Oil Content, p.p.m. | Oil Content of Finished Water, p.p.m. | Percent Oil Removed and Recovered |
|---|---|---|---|---|---|
| 1 | 80 | 1.0 | 305 | 16 | 95 |
| 2 | 100 | 1.0 | 289 | 12 | 96 |
| 3 | 85 | 1.0 | 357 | 13 | 96 |
| 4 | 85 | 1.0 | 286 | 14 | 95 |
| 5 | 85 | 1.0 | 171 | 6 | 96 |

The values set forth in the above table for the oil content of the process water in Examples 1 to 4 are average values, whereas those for Example 5 are taken from a single run.

The foregoing results indicate that a consistently high percentage of oil may be removed and recovered from process waste water by employing the simple and efficient process of this invention.

The following example demonstrates that when the particle size of the crystalline silica employed is outside the range of between about 8 and about 20 mesh, an efficient separation cannot be obtained.

EXAMPLE 6

Process waste water at a temperature in the range of from about 60 to 100° F. and containing dissolved and entrained unsaturated oils in an amount of from about 150 to about 450 p.p.m. is passed through a quartz-packed coalescer of the type employed in the previous examples. However, the coalescer is packed with pea-sized gravel instead of the 8 to 20 mesh particles of this invention.

The coalescing-agglomerating action of this larger particle size medium is very poor and the resulting water still contains about 350 p.p.m. of unsaturated oils.

The above runs demonstrate not only the high degree of purity that the water treated by the process of this invention possesses, but the fact that the previously dissolved and entrained unsaturated oils may be separately recovered in a usable form. For example, the light fractions may be utilized as a charge stock for manufacturing high-purity aromatics, such as benzene, toluene and xylenes. In addition, the heavy polymers that are recovered may be suitably employed as components of fuel oil blends. Accordingly, the yields of hydrocarbon products from cracking processes may be increased, whereas this material would otherwise be discarded.

Referring again to the drawing, many modifications may be made without departing from the spirit of the invention. For example, a plurality of filters and/or coalescers may be substituted for the single filter 17 and coalescer 25 shown in the drawing. Likewise, the recovered oil fractions and polymer tars may be subjected to additional separation into desired fractions by the use of such conventional means as a distillation or extraction towers with auxiliary equipment, such as packing, reflux means and the like.

The above description and specific embodiments are intended to be only illustrative of a process which has been found to be highly advantageous for the treatment of process waste waters, which waters were formerly employed in the direct quenching of cracked gases. However, the application of this invention is not intended to be limited in this regard and is equally applicable to the separation and recovery of unsaturated hydrocarbons from aqueous media, regardless of the source. The term "aqueous media," as used in this specification, includes any non-oily liquid which is not soluble or miscible with oils.

We claim:

1. A process for the separation and recovery of dissolved and entrained unsaturated hydrocarbons from aqueous media, which comprises contacting said aqueous media with a coalescing medium comprising crystalline silica having a particle size in the range of from about 8 to about 20 mesh, allowing said hydrocarbons to form a separate phase and recovering said hydrocarbons from the purified aqueous media.

2. The process of claim 1 wherein the coalescing medium comprises quartz.

3. The process of claim 1 wherein the coalescing medium comprises high purity sand.

4. The process of claim 1 wherein the aqueous media to be purified is water which had been previously employed as a direct quench for cracked effluent gases.

5. The process of claim 1 wherein the unsaturated hydrocarbons comprise light and heavy oils.

6. The process of claim 1 wherein the aqueous media to be purified contains unsaturated hydrocarbon impurities in an amount of from 150 to about 450 p.p.m. and the purified aqueous media contains about 15 p.p.m. of unsaturated hydrocarbons.

7. The process of claim 4 wherein the temperature of the quench water is reduced to between about 60° and about 100° F. before it is contacted with the coalescing medium.

8. The process of claim 7 wherein the temperature of the quench water is initially at a temperature of between about 125° and about 180° F.

9. The process of claim 7 wherein the coalescing medium is quartz.

10. The process of claim 5 wherein the aqueous media is conducted from the coalescing medium into a separation zone and the light oil is recovered as a top fraction, the heavy oil is recovered as a bottom fraction, and the purified aqueous media is recovered as an intermediate fraction.

References Cited

UNITED STATES PATENTS

| | | | |
|---|---|---|---|
| 1,887,774 | 11/1932 | Meinzer | 208—188 |
| 2,546,650 | 3/1951 | Nijboer | 210—65 |

FOREIGN PATENTS 902,600   8/1962   England.

DELBERT E. GANTZ, *Primary Examiner.*

G. J. CRASANAKIS, *Assistant Examiner.*

U.S. Cl. X.R.

23—313; 208—188; 260—674, 704